(12) United States Patent
Pickering et al.

(10) Patent No.: US 8,277,553 B2
(45) Date of Patent: Oct. 2, 2012

(54) PLASTICS MATERIAL

(75) Inventors: Kim Louise Pickering, Hamilton (NZ); Casparus Johannes Reinhard Verbeek, Hamilton (NZ); Carmen Viljoen, Howick (NZ); Lisa Eunice Van Den Berg, Hamilton (NZ)

(73) Assignee: Novatein Limited, Hamilton (NZ)

( * ) Notice: Subject to any disclaimer, the term of this patent is extended or adjusted under 35 U.S.C. 154(b) by 540 days.

(21) Appl. No.: 12/515,949

(22) PCT Filed: Nov. 21, 2007

(86) PCT No.: PCT/NZ2007/000345
§ 371 (c)(1), (2), (4) Date: Feb. 11, 2010

(87) PCT Pub. No.: WO2008/063088
PCT Pub. Date: May 29, 2008

(65) Prior Publication Data
US 2010/0234515 A1 Sep. 16, 2010

(30) Foreign Application Priority Data
Nov. 22, 2006 (NZ) ...................................... 551531

(51) Int. Cl.
*C08L 89/00* (2006.01)
(52) U.S. Cl. .................. 106/124.3; 106/124.5
(58) Field of Classification Search ............... 106/124.3, 106/124.5
See application file for complete search history.

(56) References Cited

U.S. PATENT DOCUMENTS

| | | | |
|---|---|---|---|
| 2,391,387 A * | 12/1945 | Bradshaw et al. | 530/380 |
| 3,515,711 A * | 6/1970 | Richards et al. | 530/380 |
| 3,615,715 A | 10/1971 | Mullen | |
| 4,064,955 A * | 12/1977 | Dyck | 177/134 |
| 4,338,340 A | 7/1982 | Morimoto et al. | |
| 5,523,293 A | 6/1996 | Jane et al. | |
| 5,710,190 A | 1/1998 | Jane et al. | |

OTHER PUBLICATIONS

Office Action received for Chinese Patent Application No. 200780043320.3, mailed on Apr. 6, 2011, 12 pages(7 pages of English Translation and 5 pages of the Office Action).
International Search Report mailed Mar. 18, 2008, for PCT Application No. PCT/NZ2007/000345 filed Nov. 21, 2007, 3 pages.
Mo, X. et al. (Oct. 2000). "Thermal and Mechanical Properties of Plastics Molded from Sodium Dodecyl Sulfate-Modified Soy Protein Isolates," *Journal of Polymers and the Environment* 8(4):161-166.

* cited by examiner

*Primary Examiner* — David M Brunsman
(74) *Attorney, Agent, or Firm* — Morrison & Foerster LLP

(57) ABSTRACT

The present invention relates to a method of manufacturing a plastic material from a protein source, the method characterized by the following steps; i) treating a protein source such as blood meal with at least one denaturing agent, such as a combination of urea, sodium sulfite and sodium dodecyl sulfate, to break interactions between proteins or portions thereof, and ii) treating the denatured protein source with sufficient pressure and temperature to consolidate the denatured protein source into a plastic material.

20 Claims, 2 Drawing Sheets

PLASTICS MATERIAL

CROSS REFERENCE TO RELATED APPLICATIONS

This is a U.S. National Phase patent application of PCT/NZ2007/000345, filed Nov. 21, 2007, which claims priority to New Zealand patent application Serial No. 551531, filed Nov. 22, 2006, all of which are hereby incorporated by reference in the present disclosure in their entirety.

TECHNICAL FIELD

This invention relates to plastics materials, and methods of producing same. More specifically, the current invention relates to plastics materials produced from a protein source.

BACKGROUND ART

Modern plastics are typically produced from petrochemical sources.

Plastics are generally made up of polymers, including long chains of repeating molecular units, or monomers. The vast majority of plastics are composed of polymers of carbon alone, or carbon in combination with oxygen, nitrogen, chlorine or sulphur in the backbone.

The properties of the polymer can be altered by introducing different functional groups into or onto the polymer backbone.

The history of plastic materials originated with the development of natural materials such as chewing gum and shellac. These materials however, require prohibitively expensive and intensive methods to isolate and manipulate the natural product.

Later developments included the use of chemically modified natural materials such as rubber and nitrocellulose, and later to the use of manmade molecules such as epoxy, polyvinylchloride and polyethylene.

The development of manmade plastic molecules has lead to a staggering worldwide increase in the use of plastics, for wide ranging purposes, including packaging, technology such as computers, cell phones and many household appliances. Plastic is cheap and easy to manufacture.

The main characteristic of polymers that allows it to be so widely-used is that some polymers can be thermoplastic (or plastic) and others can be thermosetting. Thermoplastic materials are deformable, they melt to a liquid when heated to a sufficient temperature and solidify into a solid state when cooled.

Most thermoplastics are high molecular weight polymers whose chains associate through weak Van Der Waals forces, for example in polyethylene; stronger dipole interactions and hydrogen bonding, for example in nylon; or stacking of aromatic rings, for example in polystyrene.

Thermoplastic polymers differ from thermosetting polymers. Whereas thermoplastic polymers can be repeatedly melted and cooled, thermosetting polymers, once formed and cured will not re-melt to allow re-moulding or re-use of the material.

Thermoplastic or thermosetting polymers can be formed into a desired shape by injection into moulds while in their liquid or fluid state and when cooled the shape of the mould is retained. In this way they can be easily be used to make a wide variety of complex shapes.

The manufacture of thermoplastics from petrochemical sources utilises the following general method:

1. drilling and transporting petroleum to a refinery,
2. refining crude oil and natural gas into ethane, propane and other petrochemical products,
3. cracking ethane and propane into ethylene and propylene using high temperature furnaces,
4. the addition of a catalyst to ethylene or propylene in a reactor, resulting in a powdered polymer,
5. combining the powdered polymer with additives (if required) in a continuous blender,
6. feeding the polymer into an extruder where it is melted,
7. cooling the melted plastic which is then feed into a pulveriser that cuts the cooled plastic into small pellets,
8. shipping the pellets to customers, and
9. customers manufacture plastic products from the pellets by various methods, including extrusion, injection moulding, blow moulding and rotational moulding.

While the use of petrochemical sources to produce plastics is ongoing, it has a number of significant disadvantages, both to the environment and society. These include the following:

Firstly, plastics degrade very slowly. This leads to a high accumulation of unwanted and untreatable waste.

While methods are being trialled to increase the breakdown rate of plastics, such as the incorporation of biodegradable plastics or natural materials, such as starch is increasing, this in no way matches the worldwide consumption, and subsequent disposal of plastic items.

The high waste accumulation can also be off-set by recycling. However, recycling of plastics is not easy, and again includes a number of significant disadvantages. For example it is difficult to automate the sorting of plastic wastes, for example into plastic type or colour the use of manual sorting is very labour intensive. An additional complicating factor is that while many plastic containers are made from a single type and colour of plastic, which are relatively easy to sort, many other products such as cell phones, often include many small parts of different types and colours of plastics. In these situations the time and resources required to separate the plastics for recycling far exceed their recycling value.

A second significant disadvantage of standard plastics material is their effect on the environment. The long breakdown time means that if they get into the environment they can act to harm wildlife, for example the plastic rings which hold 6-packs of cans can easily get around the necks of, and strangle birds and other wildlife. The increase of plastic waste in oceans may also lead to the transport of small species from country to country, or continent to continent. This may lead to the introduction of invasive or unwanted pests into new areas.

Similarly, burning plastic material can in some cases release toxic fumes which can be harmful to those working or living in the area which again can be harmful and be difficult to get rid of.

Also, the manufacturing of plastics can often lead to large quantities of chemical pollutants.

A third significant disadvantage of petrochemical plastics is that petroleum resources are naturally limited. Therefore, in the future this is likely to lead to increased cost and decreased desirability of using these compounds on the current scale.

The problem with using petroleum based precursors in the manufacture of adhesives has been addressed by the development of a number of protein or soy protein based adhesives.

Proteins are natural biopolymers. The amino acids found in proteins offer many chemical interactions, due to the different functional side chains. Hydrogen bonds, ionic interactions, hydrophobic interactions and covalent disulfide bonds between these side chains give a protein its native structure. Proteins are versatile materials; the properties depend on the amino acid content and the modifications that are performed to improve specific properties. Reactive amino acids in proteins include the following: amide (15-40%), acidic (2-10%), neutral (6-10%), basic (13-20%), sulfur containing (0-3%) (De Graaf and Kolster, 1998).

In the materials industry these different side chains of proteins can be manipulated and used to add cross-linkers giving the material produced new mechanical properties. The processing of adhesives, films, coatings, or other protein based materials requires the breaking of intermolecular bonds (covalent and non-covalent), arranging the free protein chains into the desired shape, and then allowing the formation of new intermolecular bonds and interactions to stabilize the three dimensional structure. Cysteine, a sulfur containing amino acid, is found to be involved in non-disulfide irreversible covalent cross-linking (lysinoalanine and others) when proteins are placed under high temperature, which can become problematical in processing (Barone and Dangaran et al, 2006; Barone and Schmidt et al, 2006; De Graaf, 2000; Marion Pommet, 2003 and Singh, 1991).

Lysinoalanine is an un-natural covalent crosslink that occurs through the formation of dehydroalanine and reactive lysl residues occurs, in alkaline and heated systems. Cystine disulfide bonds form dehydro-residues in alkaline conditions, which are the reactive precursors for lysinoalanine. These non-disulfide covalent crosslinks once formed do not melt or exchange at high temperatures (Mohammed et al, 2000). There formation in a high protein system can prevent a flowable melt material forming.

The major disadvantage of using protein based sources in the manufacture of adhesives is that the lack adhesive strength and water resistance.

This issue has been addressed by using modified proteins such as soy, for example as described in WO 00/08110 which describes a method of using modified soy protein to provide a stronger, and more water resistant adhesive.

In the soy based adhesives described in WO 00/08110, the protein molecules are dispersed, and thus partially unfolded in dispersion. The unfolded molecules increase the contact area in adhesion of protein molecules onto other surfaces. The unfolded nature of the molecules also allows them to entangle each other during the curing process to provide additional bonding strength. Soy based adhesives overcome some of the problems associated with petroleum based products; they make use of soy proteins which are environmentally friendly and derive from soy beans which are more sustainable than petroleum resources.

The soy proteins in WO 00/08110 are modified with one or more modifiers, including, for example urea, guanidine hydrochloride, SDS (Sodium Dodecyl Sulphate), and SDBS (Sodium Dodecylbenzene Sulphonate) or a mixture of these.

The method disclosed involves mixing the modifiers, water and soy protein to form a slurry or dispersion. The modifiers act to unravel the proteins. After mixing the reacted dispersion can be immediately used as an adhesive, or can be freeze dried, milled into a powder and stored for later use after being reconstituted.

WO 00/08110 discloses reaction temperatures of between 10 to 80° C. under which the mixing is carried out, however, preferably the mixing process is undertaken at ambient temperature and pressure conditions.

Bovine blood has previously been used as an adhesive. The main use of this was in the manufacture of particle board (Francis, 2000)

One disadvantage of using protein polymers which decreases their usability, is that they lack the mechanical properties of petro-chemically derived polymers—this gives them unpredictable processing characteristics.

A further significant disadvantage of protein polymers is the price. Protein polymers are significantly more expensive than commodity petro-chemically derived polymers. This increased cost has in the past been sufficient to prohibit mainstream use of protein polymers in adhesives.

The use of soy protein for the manufacture of plastic materials also, given the high volume requirement for precursor material places a strain on the supply source. This may decrease the amount of soy for food based products.

Soy proteins also have the same disadvantages mentioned for protein polymers above, mainly the lack of mechanical properties and high price.

Extrusion work on proteins has previously been undertaken for zein and soy proteins. These were plasticised with oleic acid, glycerol or water. Extensive research has also been undertaken on corn gluten meal (mixture of various proteins found in corn). It was found that various additives were necessary to plasticise these proteins, and that the material had inferior strength compared to petrochemical equivalents.

It would therefore be desirable to provide a plastics material, and method of producing same from a high volume, low cost, sustainable and renewable protein source with sufficient mechanical properties.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of manufacturing a plastic material from a protein source, the method characterised by the following steps;
   i) treating the protein source with at least one denaturing agent to break interactions between proteins or portions thereof, and
   ii) treating the denatured protein source with sufficient pressure and temperature to consolidate the denatured protein source into a plastic material.

In a preferred embodiment the method of manufacturing a plastic material from a protein source, includes the additional step of:

iii) treating or adding to the denatured protein at least one additive or agent to control or prevent further cross-links forming.

The term plastic material should be taken as meaning any substance that is able to be moulded, or formed into a desired shape or configuration.

Preferably the plastics material may have thermoplastic properties.

In a preferred embodiment the plastics material may be stable under normal use, and malleable under the correct temperature and/or pressure conditions.

Throughout this specification the term 'thermoplastic-like' or 'thermoplastic' should be taken as meaning that the product will soften and flow on the application of heat.

Alternatively the plastics material may have thermosetting properties, and not be able to be re-plasticized once formed and cured into a shape.

Throughout this specification the term 'thermosetting-like' or 'thermosetting' should be taken as meaning that the product will not soften and flow on the application of heat. One skilled in the art would realise that for this to occur the cross-links between adjacent proteins, or portions thereof would need to be broken.

In a preferred embodiment the protein source may be animal derived.

For example, waste protein from meat processing could be used as this is a plentiful and low cost source of protein. However, this should not be seen as limiting, as in some cases plant based material may be utilised with the present invention, such as soy.

In a preferred embodiment the protein source may be blood, and shall be referred to as such herein.

In a preferred embodiment the protein source may be whole blood. However, this should not be seen as limiting as any protein containing fraction of blood may be utilised with the present invention.

Protein containing fractions of blood may include isolated red blood cells, serum, or other isolated fractions from whole blood.

However the use of blood as the protein source should not be seen as limiting. A variety of other animal derived proteins may also be utilised with the present invention, for example casein, or feather meal to name a couple.

Whole blood is a preferred raw protein source of the present invention as it is a high volume waste product of abattoirs.

In New Zealand alone, 80000 tonnes of blood is collected annually as a by-product of the meat industry. This is either disposed of or sold as low cost animal food.

Proteins account for approximately 16-18% of raw blood, with 80% water content.

In one particularly preferred embodiment the protein source utilised in the method of the present invention is blood meal.

"Blood meal", is dried animal blood, usually bovine, contains approximately 80% proteins, with haemoglobin accounting for 75% of the protein content and plasma proteins the other 25%. The plasma proteins mainly consist of water soluble albumin (60%), and salt soluble globulins (35%) and fibrinogen (4%). From literature, blood meal has high lysine content, and a cysteine content of 1.4%, which is on the high side.

In most countries around the world blood from animal slaughter and meat processing has to be collected and undergo suitable treatment prior to disposal.

Given the high number of animals being slaughtered daily to meet meat demands the volume of blood which has to be disposed is considerable.

Having to treat and dispose of blood as a waste product increases the cost, labour, time and equipment required for animal and meat processing.

The high volume of blood which has to be disposed of provides a continuously available, high volume, low cost, renewable and sustainable protein source.

In one preferred embodiment the blood may be bovine blood, and shall be referred to as such herein.

Alternatively, the blood may be from other animal species such as pigs, sheep, goats, horses or any other animal which has a high slaughter or meat processing rate.

In a preferred embodiment the blood may be from an animal which leads to the highest volume of blood for disposal in the geographical area of use.

The total volume of blood produced in an abattoir or meat processing plant is calculated from the number of animals slaughtered multiplied by the volume of blood per animal.

For example, in New Zealand, and many other western countries, cattle are one of the most common meat species. Cattle have a high volume of blood per animal, and a high number of cattle being slaughtered and processed daily.

Alternatively in countries such as New Zealand which have a high sheep number and processing rates, blood from sheep may be utilised with the present invention.

However, in other areas of the world, where cattle (or sheep) may not be the main meat species, or result in the highest volume of waste blood, other animal blood may be preferred for use with the present invention. Examples of other animal species which may be utilised include pigs, chickens, camels, goats or horses.

In an alternative embodiment, the blood may be from a combination of two or more animal species. For example, this may be the case when a combination of animal species is being processed in a particular abattoir, or number of same.

According to another aspect of the present invention there is provided a thermoplastic material, including
a protein source, and
at least one denaturing agent,
characterised in that the protein source is blood, or a fraction thereof.

In a preferred embodiment the thermoplastic material may also include at least one additive or agent to control or prevent cross links forming, In a preferred embodiment the raw protein source may undergo at least one treatment step in order to form the protein source utilised in the method of the present invention.

In one preferred embodiment the raw protein source may be dried or concentrated to form the protein source utilised in the present invention.

In a preferred embodiment the protein source may have a high protein content.

In one preferred embodiment the protein source may have a protein content of at least 50%.

In a particularly preferred embodiment the protein source may have a protein content of at least 70%, and even more preferably a protein content of between 80 and 90%.

In an alternative embodiment the protein source may have a protein source up to approximately 90% protein. It should be noted that the protein content will depend on the collection and processing of the protein source prior to use with the present invention.

It will be appreciated that the protein contents provided above relate to the protein source as utilised in the method of the present invention. One skilled in the art would realise that this could either be the raw protein source (if the protein content of this is sufficient), or treated raw protein source, which has for example been dried or concentrated.

In the case where the protein source is blood, or a blood derived fraction then the protein source will preferably be dried blood/blood fraction or blood/blood fraction meal.

In a preferred embodiment the protein source may be dried whole blood; this consists of almost 90% protein.

It will be appreciated by one skilled in the art that whole blood as collected from an animal or abattoir has a protein content of approximately 16%. When this is dried the protein content is increased to approximately 80 to 90%, by removal of water which makes up the balance of the whole blood as collected.

As another example corn gluten meal contains approximately 70% protein, again this could be considered to be a high protein content.

In a preferred embodiment the protein source may be predisposed to form a sufficiently high number of cross-links or interactions to adjacent proteins, or other portions within the same protein to form a strong, yet thermoplastic-like material.

In some embodiments the term high number of cross-links may be taken to mean sufficient cross-links to form at least a thermoplastic product, and if higher, a thermosetting product.

The present inventors have shown indirectly that by limiting or decreasing the number of cross-links which form in the product the properties of the product can be controlled, resulting in a product with either thermoplastic-like or thermosetting-like properties. This is shown by the water absorption data provided in the best modes section.

The term interactions between proteins, as used herein, should be taken to include any protein-protein interaction which contributes to protein bonding or structure. Interactions may include, but are not limited to disulphide bonds, hydrogen bonding, electrostatic interactions, Van Der Waal forces, ionic interactions and hydrophobic interactions.

It will be appreciated by those skilled in the art that animal derived proteins, especially those in blood have a very high protein content, and are predisposed to forming a high number of cross-links. For this reason, animal derived proteins have previously been very difficult to process.

It is well known to those skilled in the art, and in current literature that blood and blood derived proteins are difficult to process.

Previous work undertaken with blood proteins, wherein experimentation looking at extrusion of blood proteins under high temperature conditions of 180° C. was undertaken, came to the conclusion that these proteins are not able to be thermoplastically processed (Areas, 1992)

One significant advantage of the product and process of the present invention is that it allows a thermoplastic-like product which will soften, flow and be re-mouldable to be produced from a protein source, such as blood proteins.

The present invention allows a malleable and extrudable material which is able to be reformed and therefore easily recycled to be produced from a high volume, low cost protein source such as blood.

This is something which has not previously been achieved with blood proteins, and provides a significant advance in the field of producing natural plastics materials.

The applicants anticipate that other animal derived proteins, such as casein could also be used with the present invention. However, these are not the preferred protein source due to the high price.

It is anticipated by the current inventors that the greater the proteins ability to reform cross-links during the manufacturing process the more brittle the resulting plastics material will be, and the more thermosetting-like properties the product will have.

The present inventors have found that the use of particular denaturing agents and additives in the processing of blood proteins allows a more ductile plastic material to be produced. This is due to the potential use of appropriate additives to limit or prohibit the formation of cross-links during the manufacturing process, and thus form a product with more thermoplastic-like properties.

Therefore, in the selection of a protein source, the end product, the strength and the ductility of same should be considered.

In a preferred embodiment the protein source may, or may not be in the form of whole cells.

If the protein source is in the form of whole cells, an initial lysing step may be required; this is discussed in greater detail later. The following discussion relates to proteins which are not within whole cells, or have already been treated to remove or lyse the cell membrane (in the case of animal cells) and the cell wall and membrane (in the case of plant cells).

It will be appreciated by one skilled in the art that if the raw protein source, such as whole blood has undergone a treatment step, such as drying or concentration to form the protein source utilised in the method of the present invention; this step may also act to/result in cell lysing. In this situation further treatment to lyse cells would not be required.

In a preferred embodiment the protein source may be in one of any number of physical forms prior to processing.

For example the protein source may be in a liquid or aqueous phase prior to and/or after the denaturing agent has been added.

However, this should not be seen as limiting as the protein source may also be in a dried, powdered, solid, slurry or gel-like form prior to and/or after addition of the denaturing agent.

In a preferred embodiment the denaturing agent may be any agent which results in the denaturation of proteins into a lower structured or folded protein than the original protein.

Throughout the specification the term 'denature' should be taken to mean that the protein has a loss of structural order of at least some of the protein's secondary, tertiary or quaternary structure. This may include the breaking of cross-linking or interactions, such as disulphide bonds, electrostatic forces, hydrogen bonding and other protein interactions such as Van Der Waal forces, or any other protein-protein interactions between different portions of a protein structure or adjacent proteins.

In a preferred embodiment the denaturing agent may act to disrupt or break all protein-protein interactions such that the protein is in a fully unfolded, or secondary structure configuration, and shall be referred to as such herein.

However, this should not be seen as limiting, as in some situations it may be desirable for the protein to retain some of it's secondary, tertiary, or quaternary structure.

In one preferred embodiment the denaturing agent may be a combination of two or more denaturing agents, and shall be referred to as such herein.

In a preferred embodiment one of the denaturing agents may be sodium sulfite or a functional equivalent thereof.

Sodium sulfite is known to break disulphide bonds. Other reducing agents can be used. However these are harmful and toxic, area not suitable for an environmentally friendly material.

Sodium sulfite is added to proteins to cleave disulphide bonds that produce larger aggregates insoluble even in urea (Areas, 1992).

The literature reveals that sodium sulfite solutions produced the best results in protein extrusion, as measured by the decrease in viscosity of the extruded material, when used in 3-4 wt % of the protein concentration (Zhang et al 1998; Mizani et al, 2005; Orliac et al, 2003; Barone and Schmidt et al, 2006).

Urea, Sodium Sulfite, Metabisulfite sulphuric acid and ammonia can all be considered as preservatives (hence anti-oxidant) for blood Francis, 2000).

In a preferred embodiment one of the denaturing agents may be urea or a functional equivalent thereof.

Urea is a denaturant, as well as a preservative in blood. Therefore it may be possible to substitute urea with any other compound having these functionalities.

The addition of urea to proteins is believed to break non-covalent interactions (hydrogen bonds, hydrophobic and electrostatic interactions) (Areas, 1992). Usually it is effective only at high concentration ($\geqq 8$ M) (Lapanje, 1978).

It should be appreciated that one advantage of using a compound which is a preservative is that it may also act as an anti-oxidant.

Urea, SDS and sulphuric acid are also denaturants.

In one preferred embodiment the denaturing agent may be a combination of sodium sulfite, or a functional equivalent thereof, and urea, or a functional equivalent thereof.

In another preferred embodiment one of the denaturing agents may be SDS, or a functional equivalent thereof.

Sodium dodecyl sulphate, also called sodium lauryl sulphate, has the structure of a long acyl chain containing a charged sulphate group (Whitford, 2005). Sodium dodecyl sulphate (SDS) is an ionic detergent. Detergents, by definition, unfold proteins and are effective protein solubilising agents. Detergents in general can asystematically bind to proteins, giving uncertainties in comparisons of molecular weight. Any ionic detergent bound to the protein would change the apparent charge and thus the isoelectric focussing mobility (Zewert et al, 1992).

SDS binds to almost all proteins destroying native conformation (Whitford, 2005). It is known to disrupt hydrophobic interactions (Boye et al, 2004). SDS causes proteins to unfold, become highly negatively charged and form rod-like protein micelles (Whitford, 2005).

In one preferred embodiment the denaturing agent may be a combination of sodium sulfite, or a functional equivalent thereof, and SDS, or a functional equivalent thereof.

In a particularly preferred embodiment the denaturing agent may be a combination of sodium sulfite, or a functional equivalent thereof, SDS, or a functional equivalent thereof, and urea, or a functional equivalent thereof.

It is anticipated by the applicant's that while temperature and pressure can act as denaturing agents in the present invention, these, if used for this purpose would need to be combined with chemical denaturation, using chemicals such as those described above.

In a preferred embodiment sodium sulfite is used with SDS and/or urea.

In a preferred embodiment the protein source, for example dried whole blood protein may make up at least 20% (by weight) of the components in the mixture for processing.

In one preferred embodiment the protein source may be present within a range of substantially between 20 and 90 percent of the weight of the mixture for processing.

In one preferred embodiment the protein source may be present within a range of substantially between 45 and 55 percent of the weight of the mixture for processing.

| | Total Weight % range | | | | | | | | |
|---|---|---|---|---|---|---|---|---|---|
| | BM | | Urea | | Water | | SS | | SDS |
| Min | 46.73% | Min | 2.51% | Min | 12.99% | Min | 0.47% | Min | 1.45% |
| Max | 77.52% | Max | 13.89% | Max | 42.33% | Max | 3.03% | Max | 7.35% |

In a preferred embodiment sodium sulfite may be present substantially between 1 and 10 percent of the weight of the mixture for processing.

In a preferred embodiment sodium sulfite may be present substantially between 1 and 4 percent of the weight of the mixture for processing.

In a preferred embodiment urea may be present substantially between 0 and 30 percent of the weight of the mixture for processing.

In a preferred embodiment urea may be present substantially between 15 and 25 percent of the weight of the mixture for processing.

In a preferred embodiment sufficient denaturing agent (SDS) may be provided to drive the reaction to completion and in most embodiments all three denaturants are included.

In a preferred embodiment SDS may be present substantially between 0 and 10 percent of the weight of the mixture for processing.

In a preferred embodiment SDS may be present substantially between 0.5 and 2.5 percent of the weight of the mixture for processing.

In a preferred embodiment the remainder of the mixture for processing will be made up of water.

In a preferred embodiment water may be present at above substantially 20% (weight/weight of blood meal), and preferably at approximately 60% (weight/weight of bloodmeal) which is approximately 30% of total weight.

In a preferred embodiment water may be present at substantially between 5 and 50 percent of the weight of the mixture for processing.

It should be appreciated that the above concentrations are examples only, and may differ depending on the combination of denaturing agents used in the preparation.

In a preferred embodiment the denaturing agent may be in an aqueous solution.

Urea is believed to be interchangeable with SDS when used in combination with a reducing agent. These may act by a similar mechanism; however this has not been confirmed. The applicants believe that the same product may be obtained when either of these additives is used in the manufacture;

however this may have some differing properties such as strength, brittleness, plasticity, or other physical or chemical properties.

The applicants anticipate that the combination of denaturing agents utilised in the present invention result in the rearrangement of interactions between protein molecules which leads to different structures which result in the blood proteins being more processable.

In a preferred embodiment the denaturing agent may act to break the secondary and/or tertiary and/or quaternary structure of, or between the proteins, however preferably they do not act to cleave the primary protein amino acid (peptide) sequence.

However, this should not be seen as limiting, as in some embodiments some cleaving of the protein source may be desirable. This may include the breaking of disulphide bonds between adjacent proteins, or portions thereof.

Cleaving of di-sulfide or peptide bonds of at least a portion of the protein source may increase the strength or desired properties of the plastics material, such as malleability and brittleness, or lack thereof. This may result either directly from the cleaving action, or when additional additives, such as plasticizers are included in the processing mixture.

In a preferred embodiment at least one of the denaturing agents utilised may also act to control or prevent cross links from forming during reconstitution of the protein source into a plastics material, and shall be referred to as such herein.

In an alternative embodiment, additional additives may be utilised to control or prevent cross links from forming during reconstitution of the protein source into a plastics material.

In a preferred embodiment sodium sulfite may be the denaturing agent which acts to control or prevent cross links from forming.

Therefore, in preferred embodiments the mixture to be processed may contain a sufficient amount of sodium sulfite to prevent or control cross linking.

Sodium sulfite is known to act to break or cleave di-sulfide bonds between proteins or portions thereof by the following reaction:

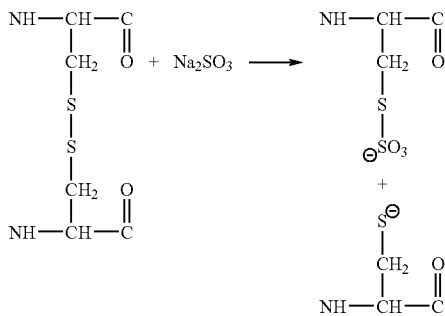

Sodium sulfite is bound up during this process. However, the use of excess sodium sulfite may act to prevent (or break once formed) any new di-sulfide bonds from being formed.

Sodium sulfite is also believed to prevent the formation of cross-links between cysteine and/or serine with lysine, which occur in alkaline conditions in the presence of heat.

Cysteine, a sulfur containing amino acid, is found to be involved in non-disulfide irreversible covalent cross-linking (lysinoalanine and others) when proteins are placed under high temperature. Lysinoalanine is an un-natural covalent crosslink that occurs through the formation of dehydroalanine and reactive lysl residues occurs, in alkaline and heated systems. Cystine disulfide bonds form dehydro-residues in alkaline conditions, which are the reactive precursors for lysinoalanine. These non-disulfide covalent crosslinks once formed do not melt or exchange at high temperatures (Mohammed et al, 2000). There formation in a high protein system can prevent a flowable melt material forming.

In a preferred embodiment the formation of a plastics material may be due to the formation of desirable secondary interactions between adjacent proteins, or portions thereof. For example the literature currently shows that reconfiguring a protein structure from an alpha-helix structure to beta-sheet structure makes it more processable—i.e. interactions were broken and other interactions were formed during processing.

The properties of the resulting plastics material is dependent upon the denaturing agents utilised and the conditions under which consolidation occurs. These factors will influence whether the plastics material is soft and pliable, i.e. thermoplastic-like, or hard and brittle, i.e. thermosetting-like.

Throughout this specification the term consolidate should be taken as meaning the denatured protein solution becoming solid or firm in the form of a plastics material.

In a preferred embodiment the denatured protein solution may be consolidated by the treatment with a combination of high temperature and high pressure.

It is anticipated that the temperature and pressure provide a synergistic effect in addition to the denaturing agents discussed above. This allows protein sources, which have previously not been processed into plastics materials to be utilised.

It is anticipated that the pressure contributes to consolidation by increasing the proximity between denatured proteins. This contributes and facilitates the reformation of protein-protein interactions required to consolidate the denatured protein into the final product—a plastics material.

Another result of the high pressure may be that it contributes to the denaturation of proteins, thereby exposing appropriate protein groups and side chains for interaction with other adjacent proteins, or portions thereof.

It is anticipated that high temperature also facilitates the re-formation of protein-protein cross-links and interactions.

High temperature has previously been shown to cause or increase the cross-linking or interaction between blood proteins.

In a preferred embodiment the temperature required for the consolidation of the denatured protein source may be greater than the activation temperature or energy required for the chemical reaction.

It is also anticipated that high temperature may decrease the viscosity of the system which in turn makes it easier for components to react with one another.

In a preferred embodiment the temperature required for the consolidation of the denatured protein source may be at least approximately 80° C.

In a preferred embodiment the temperature utilised for the consolidation of the denatured protein source using either extrusion or injection moulding may be less than, or substantially 120° C.

In one preferred embodiment the temperature may be 115° C.

It should be appreciated that the temperature used may depend on the method utilised to extrude or mold the plastic material. For example lower temperatures would be likely to be utilised in an extruder than when injection molding. This is due to water being able to exit the system as vapour, which is not possible during injection molding.

Due to water being utilised as a plasticizer different properties of the plastics material will also be obtained for different conditions in different methods.

In a preferred embodiment the plastics material of the present invention may be molded using a closed system, such as injection molding rather than an open system, such as an extruder.

For example using the same components injection molding resulted in more desirable properties. This may be due to the presence of 'super-heated' water and higher pressure than what can be obtained in an extruder. In an extruder, heated water can be lost as vapour and the majority of pressure is due to back pressure.

The injection mould cannot take powder material only granulated material. Therefore injection moulding occurs after extrusion.

In a preferred embodiment the pressure required for the consolidation of the denatured protein source may be at least approximately 5 MPa.

In a preferred embodiment the pressure may be approximately 3 MPa.

Pressure of this level is desired as it forces the components into close proximity with one another, this is especially the case when the viscosity of the processing mixture is high. The pressure utilised may also affect the reformation of di-sulfide bonds. This may be due to the increased proximity of proteins or portions thereof, or the presence of water at a high temperature and pressure.

It should be appreciated that in processes such as thermoforming (such as compression molding) there is a relationship between the temperature and pressure required. For example as the temperature is lowered, higher pressure is required. This is due to the processing mixture having a higher viscosity at lower temperatures, the mixture therefore requiring higher pressure.

It should be appreciated that consolidation results from the formation of protein-protein cross-links or interactions. These may be, or include any normal protein-protein interaction between molecules.

In a preferred embodiment the processing mixture or slurry of denatured protein may have increased temperature and pressure applied in a heated press, or molding apparatus, such as those for extrusion or injection molding. However, this should not be seen as limiting as any other suitable method known to one skilled in the art may be utilised with the present invention.

If cross-linking within the mixture can be controlled or prohibited during consolidation it will also be possible to use other plastic molding methods, for example, extrusion.

At a sufficient temperature and pressure the denatured protein slurry solidifies into a plastic material.

So far the applicant's experimentation has shown that the resulting plastics material may be either a thermoplastic-like plastic material product which can be remoulded and extruded, or a thermosetting-like plastic material product which does not soften when reheated.

The applicants believe that this may be controlled or altered by controlling the number of cross-links which re-form during consolidation.

For example, if less cross-links form the product may have more thermoplastic properties. Alternatively, this property may be due to a particular form of cross-linking or interaction being more prevalent.

For example, a greater number of disulphide bonds may provide more thermosetting properties than if a weaker interaction were most prevalent, for example Van Der Waal forces. This is due to the irreversible nature of disulphide bonds, compared to other interactions which can be broken by increasing the temperature, or alternatively the addition of plasticizers.

When controlling the reformation of cross-links it is anticipated that this may be controlling of disulfide bridges between proteins or portions thereof.

The strength of the final product is, in part, provided by the reformation of cross-linking such as disulphide bonds and secondary interactions.

In a preferred embodiment the formation of cross-links and protein interactions during consolidation may be controlled by the addition of chemicals which prevent these interactions forming.

The formation of cross-links is believed to be controlled and/or prevented mainly by the action of the chemical denaturing agents, such as sodium sulfite. Di-sulfide bonds, which are one of the main forms of cross-links controlled, can be broken by increased heat. However, the heat required to break would also lead to the breaking of peptide bonds. This is undesirable during the consolidation process.

However, this should not be seen as limiting, as the control and/or prevention of cross linking may be via physical means, or a combination of physical and chemical means. It should be appreciated that the conditions need to be chosen appropriately to minimise side reactions, such as cross-linking through cysteine and serine amino acids.

In some embodiments at least one further additive may be added to the protein slurry to result in a thermoplastic-like product.

Additional additives may include, but are not limited to glycerol, PEG, oleic acid or other common plasticizers.

The addition of plasticizers such as these may also result in a lower amount of water being required. Water makes analysing the material difficult, and also water can evaporate changing the mechanical properties of the material. Less water, the stiffer the material.

The inventors have however shown in the data provided that standard plasticizes are not required thereby providing a significant advantage to the plastic material of the present invention.

The inventors believe that the denaturing agents utilised such as urea and SDS, although may be used as plasticizers in other cases, do not act in this manner in the present invention on their own. The present invention requires the use of denaturing agents and water, which acts as a plasticizer.

In a preferred embodiment the plastics material may be biodegradable.

It should be appreciated by one skilled in the art that if the product is not particularly biodegradable due to high cross-linking or other reasons then biodegradability can be induced by adding at least one chemical additive which can prevent the formation of disulphide bonds.

In a preferred embodiment if the protein source contains whole cells the method may also include an initial set of lysing the cells.

In a preferred embodiment any suitable lysing agent may be utilised for this purpose, such as SDS or linear alkylbenzene sulfonate (LAS).

In a preferred embodiment the steps of lysing whole cells (if required), and denaturing proteins, including the breaking of disulphide bonds is undertaken when the protein is in a slurry or fluid state. In a preferred embodiment water is used to form the slurry or fluid state.

In some embodiments the lysing and denaturing agents may be added substantially simultaneously. Alternatively lysing of whole cells may be undertaken as an initial step.

It is anticipated that the lysing and/or denaturing agents will not need to be removed from the reaction mixture prior to consolidation.

In some embodiments the plastic material may be reinforced by the addition of fibres to the protein slurry prior to treatment with temperature and pressure.

According to another aspect of the present invention there is provided a plastics material produced substantially by the method herein described.

It is anticipated that the plastics material may be used for a wide variety of purposes for example seeding planters, and as a general material for building, pallets etc.

The protein based plastics material of the present invention has a number of significant advantages over current plastics materials, including the following:
- It utilises a high volume, low cost protein source,
- It allows production of a thermoplastic product which does not require the addition of plasticizers,
- It is environmentally friendly
- It decreases the volume of petroleum based plastic material required,
- It is a method which can be readily industrialised.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
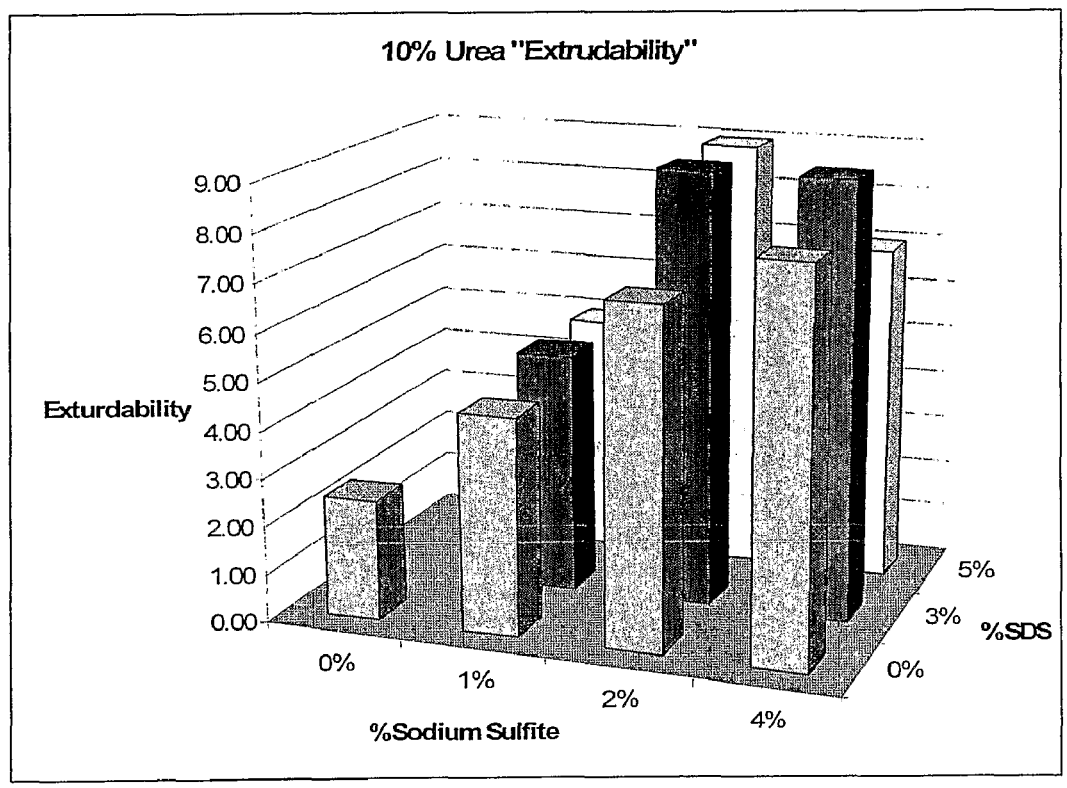
FIG. 1 shows a graph of the 'extrudability' of a mixture of blood meal and the three denaturants, sodium sulfite, SDS and urea both alone and in combination.

Initial experimentation undertaken by the inventors showed the production of a plastics material with substantially thermosetting properties. This is shown in section 1. Further experimentation showed the possibility of producing a plastics material with substantially thermoplastic properties. This is shown in section 2.

EXPERIMENTAL

Materials:
Dried whole blood
Urea

The addition of urea to proteins is said to break non-covalent interactions (hydrogen bonds, hydrophobic and electrostatic interactions) (Areas, 1992). Usually it is effective only at high concentration ($\geq 8$ M) (Lapanje, 1978).
Sodium sulfite Sodium sulfite is added to proteins to cleave disulphide bonds that produce larger aggregates insoluble even in urea (Areas, 1992).

The literature sited revealed that sodium sulfite solutions produced the best results in protein extrusion, as measured by the decrease in viscosity of the extruded material, when used in 3-4 wt % of the protein concentration (Zhang et al 1998; Mizani et al, 2005; Orliac et al, 2003; Barone and Schmidt et al, 2006).
Sodium Dodecyl Sulphate (SDS)

Sodium dodecyl sulphate, also called sodium lauryl sulphate, has the structure of a long acyl chain containing a charged sulphate group (Whitford, 2005). Sodium dodecyl sulphate (SDS) is an ionic detergent. Detergents, by definition, unfold proteins and are effective protein solubilising agents. Detergents in general can asystematically bind to proteins, giving uncertainties in comparisons of molecular weight. Any ionic detergent bound to the protein would change the apparent charge and thus the isoelectric focussing mobility (Zewert et al, 1992).

SDS binds to almost all proteins destroying native conformation (Whitford, 2005). It is known to disrupt hydrophobic interactions (Boye et al, 2004). SDS causes proteins to unfold, become highly negatively charged and form rod-like protein micelles (Whitford, 2005).
Water Water is added as solvent denaturant for denaturants and additives.
Section 1:
Equipment and Method
Z-blade mixer Denaturants and additives were dissolved in water; where SDS was used the solution was heated between 50-60° C. Dried blood was added to this solution. This mixture was then mixed in a Z-blade mixture at 80° C. for at least 15 min. The following combination of constituents, given in weight percentage terms, was used as shown in the table.

| | Weight percentage of each component | | | | |
|---|---|---|---|---|---|
| Trial | Blood | SDS | Urea | Sodium sulfite | Water |
| 1 | 100 | | | | |
| 2 | 96 | | | 4 | |
| 3 | 70.7 | | | 2.8 | 26.5 |
| 4 | 70 | | 10 | | 20 |
| 5 | 75 | 1.25 | | | 23.75 |
| 6 | 24 | 2.5 | 24.5 | | 49 |

When SDS was used in conjunction with urea the blood powder swelled up and appeared to absorb the solution. The mixture had a clay-like texture and appearance, but was not successfully consolidated.

None of the experiments performed in the Z-blade mixer manages to result in the formation of a plastic material from the blood powder. This was attributed to the lack of mechanical force, such as pressure and shear, being exerted on the material by the blades of the Z-blade mixer.

The denaturation temperature of proteins are on average 75° C. Cross-linking of proteins could occur at temperatures above the denaturation temperature, which would result in the material forming insoluble aggregates that would resist softening.
Twin Screw Extruder Denaturants and additives were dissolved in water; where SDS was used the solution was heated between 50-60° C. Dried blood was added to this solution. This mixture was then extruded in a twin screw extruder at 100 rpm. The extruder temperature profiles and combination of constituents, given in weight percentage terms, were used as shown in the table.

| | Weight percentage of each component. | | | | | |
|---|---|---|---|---|---|---|
| Trial | Blood | SDS | Urea | Sodium sulfite | Water | Temperature profile (° C.) |
| 1 | 24 | 2.5 | 24.5 | | 49 | 130-130-115-100-80 |

A continuous plastic material was extruded. Material lost elasticity upon drying. Material cannot be processed after initial processing.

-continued

| Trial | Blood | SDS | Urea | Sodium sulfite | Water | Temperature profile (° C.) |
|---|---|---|---|---|---|---|
| 2 | 24 | 2.5 | 24.5 | | 49 | 110-110-115-100-80 |
| | Comments: No continuous plastic material was obtained. | | | | | |
| 3 | 24 | 2.5 | 24.5 | | 49 | 110-110-105-95-80 |
| | Comments: A continuous plastic material was extruded. Material lost elasticity upon drying. | | | | | |
| 4 | 57 | 2 | | | 41 | 115-115-105-95-80 |
| | Comments: No swelling in SDS solution. No continuous plastic material was obtained. | | | | | |
| 5 | 57 | | 14.3 | | 28.6 | 115-115-105-95-80 |
| | Comments: No swelling in urea solution. No continuous plastic material was obtained. | | | | | |
| 6 | 52 | 2 | | 1.5 | 44.5 | 115-115-105-95-80 |
| | Comments: Material hardened and set in extruder die. A continuous plastic material was obtained. | | | | | |

Weight percentage of each component.

A plastic material was successfully produced using blood proteins, although extrusion is not possible due to its thermosetting properties.

Heated Press

The combination of denaturants and additives used in the successful extrusion experiments, were used in subsequent heated press trials. The following combination of constituents, given in weight percentage terms, was used as shown in the table.

The denaturants and additives were dissolved in water; where SDS was used the solution was heated between 50-60° C. Dried blood was added to this solution. Material was processed in heated press for an average time of 3 min.

Weight percentage of each component

| Trial | Blood | SDS | Urea | Sodium sulfite | Water | Temperature (° C.) | Pressure (MPa) |
|---|---|---|---|---|---|---|---|
| 1 | 50.8 | 1.6 | 15.9 | | 31.7 | 130 | 30 |
| 2 | 50.8 | 1.6 | 15.9 | | 31.7 | 130 | 10 |
| 3 | 50.8 | 1.6 | 15.9 | | 31.7 | 130 | <1 |
| 4 | 50.8 | 1.6 | 15.9 | | 31.7 | 118 | <1 |
| 5 | 50.8 | 1.6 | 15.9 | | 31.7 | 105 | <1 |
| 6 | 50.8 | 1.6 | 15.9 | | 31.7 | 100 | 25 |
| 7 | 50.8 | 1.6 | 15.9 | | 31.7 | 120 | 10 |
| 8 | 51.9 | 2.2 | | 1.5 | 44.4 | 120 | 10 |
| 9 | 51.9 | 2.2 | | 1.5 | 44.4 | 120 | <1 |
| 10 | 51.9 | 2.2 | | 1.5 | 44.4 | 110 | 5 |
| 11 | 51.9 | 2.2 | | 1.5 | 44.4 | 100 | 5 |
| 12 | 51.9 | 2.2 | | 1.5 | 44.4 | 110 | <1 |

When urea was used with SDS, the material formed had a more granular appearance at lower pressure and temperature. In such cases, only the centre of the pressed sample has a smooth continuous appearance, with the outer rim remaining in granular form. Satisfactory results were achieved using conditions of 120° C. and 10 MPa.

When sodium sulfite was used with SDS, results were obtained as for mixtures containing urea. Satisfactory results were achieved using conditions of 110° C. and 10 MPa.

Temperature and pressure were found to show an interactive effect on processing, hence an appropriate combination of temperature and processing is necessary for processing. Lower limits are approximately 100° C. and 5 MPa pressure.

Section 2:

Mixture Preparation

Note: The amount of denaturant and water used is based on the total weight of dried blood meal used, not the total weight fraction.

The denaturants were added to the water, stirred and heated to 50-60° C. 2.5 g of Titanium dioxide (pigment) was added to each solution before addition to sieved blood meal (BM). The denaturant/pigment solution was added to 150 g sieved BM and mixed in a processor for 1 minute. Any accumulated material was removed from the sides of the processor and mixed continued for a further 5-10 minutes. The preliminary testing (majority of compression mold and the first extrusions) were completed using the highlighted concentrations in the following table, specifically:

3% SDS: 150 g BM, 4.74 g SDS and 94.76 mL of water,
32% Urea: 150 g BM, 47.39 g Urea and 94.76 mL of water, and
2% Sodium sulfite (SS): 150 g BM, 3.0 g SS and 94.76 mL of water

| SDS | BM (g) | SDS (g) | water (ml) | Urea | BM (g) | Urea (g) | water (ml) | SS | BM (g) | SS (g) | water (ml) |
|---|---|---|---|---|---|---|---|---|---|---|---|
| 0 | 150 | 0.00 | 94.76 | 0% | 150 | 0.00 | 94.76 | 0 | 150 | 0.00 | 94.76 |
| 3% | 150 | 4.74 | 94.76 | 10% | 150 | 15.00 | 94.76 | 1% | 150 | 1.50 | 94.76 |
| 5% | 150 | 7.50 | 94.76 | 20% | 150 | 30.00 | 94.76 | 2% | 150 | 3.00 | 94.76 |
| 10% | 150 | 15.00 | 94.76 | 32% | 150 | 47.39 | 94.76 | 4% | 150 | 6.00 | 94.76 |
| 15% | 150 | 22.50 | 94.76 | 40% | 150 | 60.00 | 94.76 | 6% | 150 | 9.00 | 94.76 |
| | | | | 60% | 150 | 90.00 | 94.76 | | | | |

Preliminary Testing

Compression Mold

Mixtures were pressed at temperatures between 95-140° C., and pressures between 0-100 kg/cm$^2$ for 10 minutes. The following was observed:

A consolidated material was not produced without the use of constant pressure.

Only temperatures from 115-140° C. produced a homogenous/consolidated material.

Without sodium sulfite the material was granular, and not homogenous.

Temperatures above 120° C. would "extrude" from the mold, and proved to be very difficult.

From previous experiments, only the combinations of SDS/SS and SDS/Urea were used. The combination of all three denaturants was also tested, SDS/Urea/SS.

The best results, for flexibility and "consolidation" were obtained with the solution containing all three denaturants; therefore it was decided to continue with this combination.

After testing a series of temperatures and pressures the 115° C. and 3 MPa gave satisfactory results.

The extrudates were re-processable both in the compression mold and injection mold. The extra pressure and direct temperature of the extruder that can be applied are an advantage; with the use of the injection mold extra shear and pressure continuous samples are able to be produced.

The extrusion is much easier technique but so far preliminary results show a reproducible product, with the injected sample.

Extrusion is the trend within the plastic industry at the moment, and the fact that the present inventors have shown that BM can be extruded is a significant advance in this field.

Temperature Limits

The material was extruded at 150 rpm using the temperatures shown in the following table. The highlighted row was preferred.

Barrel temperatures above 100° C. caused pressure/steam build up in the barrel, also material became solid and would not extrude well.

Die temperatures above 120° C. caused steam and then material produced was very irregular, hard, not reusable.

| Set Temp ° C. | | | Actual Temp ° C. | | |
|---|---|---|---|---|---|
| Feed | Barrel | Die | | Barrel | Die |
| 70 | 80 | 80 | 83 | 89 | 92 | 92 |
| | | 100 | 83 | 85 | 96 | 105 |
| | | 120 | 82 | 88 | 106 | 118 |
| | | 140 | 83 | 99 | 115 | 141 |
| 70 | 100 | 80 | 103 | 104 | 106 | 90 |
| | | 100 | 104 | 104 | 105 | 101 |
| | | 120 | 104 | 104 | 111 | 126 |
| | | 140 | 104 | 104 | 120 | 145 |
| 70 | 120 | 80 | 133 | 136 | 133 | 84 |
| | | 100 | 125 | 125 | 128 | 112 |
| | | 120 | 125 | 125 | 127 | 121 |
| | | 140 | 125 | 125 | 130 | 140 |

Extrusion

Feed temperature of 70° C., with constant barrel temperature 100° C. are and die temperatures no higher than 120° C. were utilised. All experiments were run at 150 rpm.

Water and BM alone were also extruded, this produced areas of solid material (compressed powder), but the majority of sample was powder. This was collected as the material exited the extruder with a large container.

Neither SDS nor Urea alone (with BM and water) formed a homogenous material, the material formed using these was often crumbly on the outer surface.

The use of sodium sulfite alone (with BM and water) produced a homogenous material.

However, this was quite hard and processing was difficult. The die became blocked by solid material, only when the feed was not constant.

The use of sodium sulfite and urea or SDS produced a homogenous material. SDS and sodium sulfite produced a hard material. This was successfully injection molded, but needs a higher injection pressure.

Urea both acts as a denaturant and plasticizer, with a ductile, flexible material produced.

SDS, SS and Urea mix was also extruded. This mixture was used for the majority of testing, and the samples produced were continuous, having a nice consistency.

Injection Molding

All extrusions were injection molded at a barrel temperature (100, 120, 140) (except the combination containing only SDS).

Using the hot press, a fraction of the material containing SS only was pressed at 130° C. and 10 ton.

This melted and formed a thin and brittle material.

The SS and SS/SDS samples were then injection molded, this was successful.

When released out of mold the samples needed to be placed under a flat surface to prevent the samples from curling up.

To prevent curling in the conditioning chamber, rubber bands were placed around samples. This caused an indent in the samples; therefore it was decided to use a splint in future.

Samples containing Urea were very flexible, and did not curl up.

The solubility tests showed that from extrusion to injection molding the samples increased in both absorption and solubility. So far the Urea and Sodium sulfite samples absorbed the most water and were the most soluble.

Tensile Testing

The samples were tested using a crosshead speed of 5 mm/min, with the results shown in the following table.

| | MAX STRESS (MPa) | Break Disp (mm) | Modulus (MPa) |
|---|---|---|---|
| Urea/SS | 0.6-1 | 40-50 mm | 1.3-2.5 |
| Urea/SS Cond* | 5.5-6 | 20-23 mm | 300-400 |
| SS | 3.3-6 | 10-20 mm | 150-600 |
| SS Cond* | 20-21 | 0.2-0.5 mm | 1400-2300 |
| Urea Cond* | 6-8 | 17-20 mm | 600-1000 |
| SDS/Urea Cond* | 6.2-7.1 | 18-21 mm | 400-1000 |
| SDS SS cond* | 21-23 | 0.5-3 mm | 600-900 |

*conditioned samples

Conditioned samples had a moisture content of 10%, where as the unconditioned had moisture content around 30%.

It was found that the percentage of water present significantly affected the mechanical properties of the final plastics material.

Moisture Content

Average Moisture Contents for the Samples are Given Below.

| BM | EXTRUDED | INJECTION | Conditioned |
|---|---|---|---|
| 4.18% | 26.36% | 24.12% | 9.05% |

Different Protein Sources

Different protein sources were tested to see if they could also be used to form a plastics material utilising the method of the present invention.

Fish meal (60-70% protein), feather meal (~90% protein) and blood meal (Wallace Corporation) have been trialed using the same formulation.

Blood meal from Wallace Corporation worked the same as the blood meal from Taranaki by-products (used in experimentation discussed above). The Wallace BM was finer in composition however, producing a more homogenous material.

Feather meal worked at 4% sodium sulfite, in combination with other denaturants. However, a plastics material could not be formed with feather meal with either 2% SS or 6% SS.

The inventor's have to date been unsuccessful in producing a plastics material from the fish meal utilising any of the denaturant combinations discussed above.

The success of other protein sources may depend on how the protein sources are produced (for example drying using heat and chemicals). Particular conditions may result in the protein source already being denatured, and possibly cross linked.

The low protein content of the fish meal could also be a factor preventing the consolidation using the method of the present invention.

EXPERIMENTAL

The solutions were processed as in the previous experiments, using the concentrations shown in the following table. These included: SDS as the only denaturing agent; SS as the only denaturing agent; urea as the only denaturing agent, along with combinations of two or three of these.

NB: All % are based on the total Blood meal weight used.

| SDS | BM (g) | SDS (g) | water (ml) | Urea | BM (g) | Urea (g) | water (ml) | SS | BM (g) | SS (g) | water (ml) |
|---|---|---|---|---|---|---|---|---|---|---|---|
| 0 | 150 | 0.00 | 94.76 | 0% | 150 | 0.00 | 94.76 | 0 | 150 | 0.00 | 94.76 |
| 3% | 150 | 4.74 | 94.76 | 10% | 150 | 15.00 | 94.76 | 1% | 150 | 1.50 | 94.76 |
| 5% | 150 | 7.50 | 94.76 | 20% | 150 | 30.00 | 94.76 | 2% | 150 | 3.00 | 94.76 |
| 10% | 150 | 15.00 | 94.76 | 32% | 150 | 47.39 | 94.76 | 4% | 150 | 6.00 | 94.76 |
| 15% | 150 | 22.50 | 94.76 | 40% | 150 | 60.00 | 94.76 | 6% | 150 | 9.00 | 94.76 |
|  |  |  |  | 60% | 150 | 90.00 | 94.76 |  |  |  |  |

The combinations marked 'X' in the following table are the combinations that have been tried to date:

| | | | UREA | | | | | | | | | | | | | | |
|---|---|---|---|---|---|---|---|---|---|---|---|---|---|---|---|---|---|
| | | | 0% | | | | | 5% | | | | | 10% SDS | | | | |
| | | | 0% | 3% | 5% | 10% | 15% | 0% | 3% | 5% | 10% | 15% | 0% | 3% | 5% | 10% | 15% |
| 60% Water | Sodium Sulfite | 0% | X | X | X | X | X | | | | | | X | | | | |
| | | 1% | X | | | | | | | | | | X | X | X | | |
| | | 2% | X | X | | | | | | | X | | X | X | X | | |
| | | 4% | X | | | | | | | | | | X | X | X | | |
| | | 6% | X | | | | | | | | | | | | | | |

| | | | UREA | | | | | | | | | | | |
|---|---|---|---|---|---|---|---|---|---|---|---|---|---|---|
| | | | 20% SDS | | | | | 30% SDS | | | | | 40% SDS | 60% SDS |
| | | | 0% | 3% | 5% | 10% | 15% | 0% | 3% | 5% | 10% | 15% | 0% | 0% |
| 60% Water | Sodium Sulfite | 0% | X | | | | | X | X | | | | X | X |
| | | 1% | | | | | | | | | | | | |
| | | 2% | | X | | | | X | X | | | | | |
| | | 4% | | | | | | | | | | | | |
| | | 6% | | | | | | | | | | | | |

The mixtures were extruded using 70° C. (feed), 100° C. (barrel), and 120° C. (die) temperatures.

The extruded material was granulated, and injection molded at (100° C., 115° C., 120° C.).

The samples were conditioned and tensile tests were performed at 5 mm/min crosshead speed.

Not all mixtures produced perfect extrudates. Once injection molded, the resulting material was consolidated and homogenous.

For example, the extrudates not containing sodium sulfite were often not homogenous, or continuous with a rough crumbly surface. These were granulated, sieved to remove small particles (if any) and then injection molded.

Where as sodium sulfite alone, was very hard, and caused difficulties by setting in the die of the extruder.

All three denaturants together flow better in the extruder. Without SDS, the material still extrudes. 5% SDS and 4% SS at 10% urea, the product flows well, but has air bubbles. This may be due to high a level of denaturation. These results are shown in FIG. 1.

The table below provides details of preferred concentrations of each component:

| | Minimum (weight % of Blood meal) | Maximum (weight % of Blood meal) | |
|---|---|---|---|
| Water | 20% | 80% | 60% has been used for all mixtures |
| Urea | 0% | 30% | Above 30% urea residue forms on surface |
| SDS | 0% | 10% | At 10% the material is no longer extrudable |

-continued

| | Minimum (weight % of Blood meal) | Maximum (weight % of Blood meal) | |
|---|---|---|---|
| Sodium Sulfite | 1% | 4% | Essential. Without it material is not consolidated, this also prevents crosslinks such as lysinoalanine. |

SDS and sodium sulfite still need to be tested in combination, along with higher concentrations of SDS with all three denaturants. Also still requiring experimentation is the effect of different water contents for extrudability.

Mechanical Properties:

The below table shows the mechanical properties of the conditioned materials (10% moisture content), this indicates that:

When sodium sulfite is the only denaturant used, as the concentration increases the Young's modulus decreases, and the Stress at maximum load stays similar. This means the material becomes stiffer with increasing concentrations of sodium sulfite.

When SDS is the only denaturant used, the Young's modulus decreases slightly up to 10% SDS. The difference between 10% and 15% SDS could be caused by (nearly full denaturation) further extension of chains, opening the protein up exposing hidden disulfides. Thus allowing new intermolecular interactions to occur, increasing the strength and stiffness.

Increasing urea concentration decreases both Young's Modulus and Stress, but increases extension. Therefore acting as a denaturant and plasticizer. However, in combination, a smaller % would be required, because the denaturants will act synergistically.

| Urea (wt %/BM) | SS (wt %/BM) | SDS (wt %/BM) | Max Stress (MPa) | Max % Strain | Youngs Modulus (MPa) |
|---|---|---|---|---|---|
| | 1 | | 0.00 | | 645.95 |
| | 2 | | 681.16 | 3.07 | 681.16 |
| | 4 | | 0.00 | | 711.53 |
| | 6 | | | | |
| | | 3.16 | 542.23 | 2.25 | 542.23 |
| | | 5 | 518.64 | 2.52 | 518.64 |
| | | 10 | 504.84 | 2.94 | 504.84 |
| | | 15 | 770.76 | 3.37 | 770.76 |
| 10 | | | 0.02 | | 471.83 |
| 20 | | | 0.05 | | 239.66 |
| 30 | | | 0.32 | | 98.74 |
| 40 | | | 0.52 | | 17.41 |
| 60 | | | 0.40 | | 1.84 |
| 5 | 2 | 3.16 | 621.24 | 4.09 | 621.24 |
| 10 | 1 | | 711.68 | 4.84 | 711.68 |
| 10 | 1 | 3.16 | 285.60 | 6.19 | 285.60 |
| 10 | 1 | 5 | 267.72 | 4.60 | 267.72 |
| 10 | 2 | | 373.92 | 4.61 | 373.92 |
| 10 | 2 | 3.16 | 311.92 | 2.78 | 311.92 |
| 10 | 2 | 5 | 246.58 | 4.36 | 246.58 |
| 10 | 4 | | 323.38 | 5.34 | 323.38 |
| 10 | 4 | 3.16 | 297.45 | 7.69 | 297.45 |
| 10 | 4 | 5 | 276.44 | 4.96 | 276.44 |
| 20 | 2 | 3.16 | 185.28 | 17.22 | 185.28 |

Water Absorption 40 mm length of sample was placed in 150 ml of distilled water for 24 hours. Before weighing the sample, paper towels were used to remove excess water. The sample was placed in the 100° C. oven for 12+ hours then reweighed.

Figure 2:
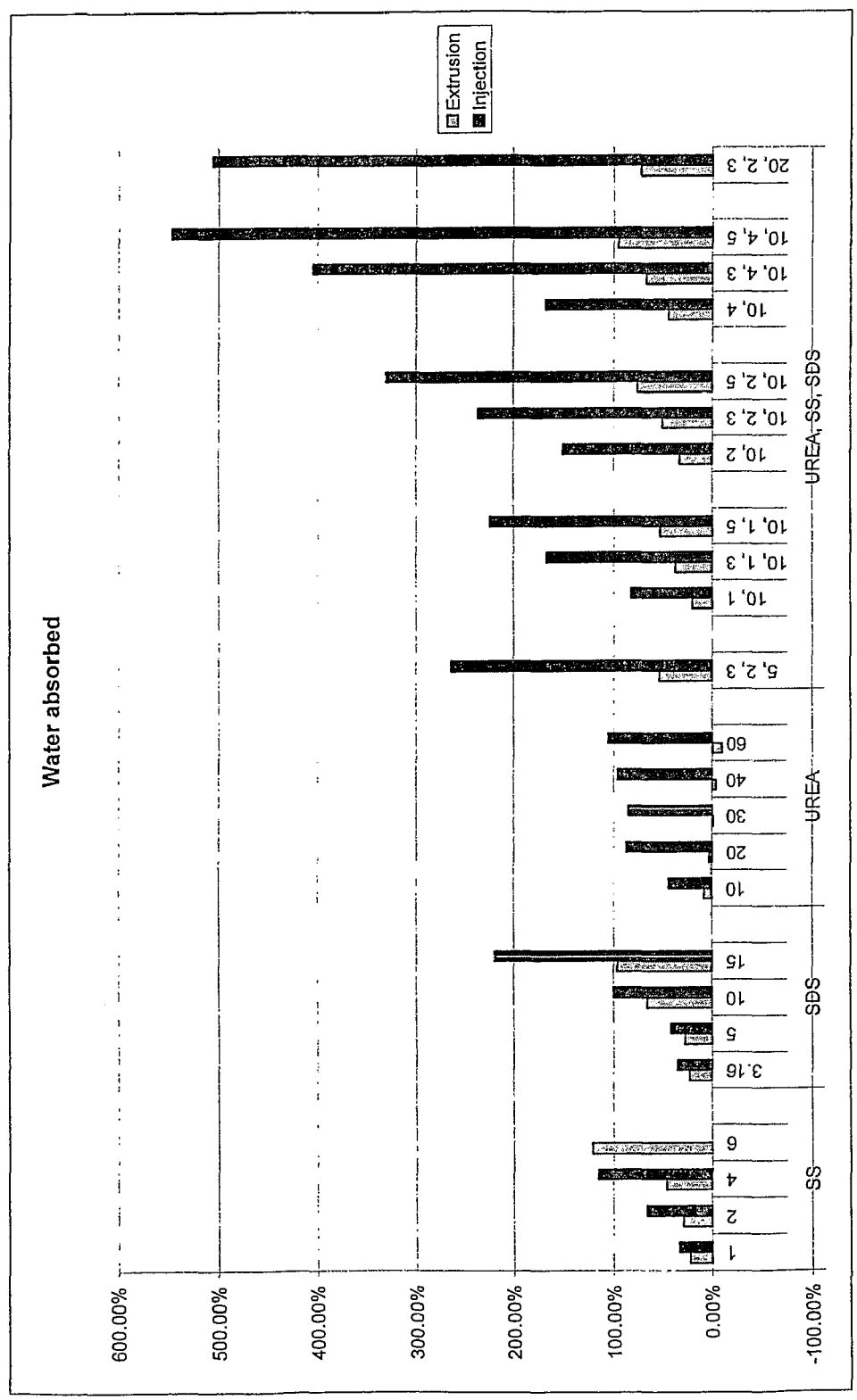
FIG. 2 shows a graph of the water absorption of extruded and injection molded samples.

There is a clear difference between the water absorption of the extruded samples compared to the injection molded, as shown in FIG. 2.

Discussion

The hydrogen, hydrophobic and ionic interactions in a protein govern the final structure of a protein, with disulfide bonds adding stability. The addition of denaturants disrupts such interactions allowing the extension of the polypeptide chains. Allowing new intermolecular interactions to occur, forming three-dimensional networks, similar to synthetic polymers.

Therefore the processing of films, coatings, or other materials based on agricultural origin requires three main steps:
1. Breaking of intermolecular bonds (non-covalent and covalent, if necessary) that stabilize polymers in their native forms by using chemical or physical rupturing agents
2. arranging and orientating mobile polymer chains in desired shape
3. and finally allowing the formation of new intermolecular bonds and interactions to stabilize the three-dimensional network The following denaturants, Urea, sodium dodecyl sulfate and sodium sulfite are used widely in biochemistry studies on protein denaturation and on a smaller scale protein-based plastics (Barone and Schmidt, 2006; Rhim et al, 2002; Vanessa Schmidt, 2005; Zhong et al, 2002, Mo et al, 2000; Khan et al, 1987; Das et al, 2004; Gonzales-Jimenez et al, 2002; Li et al, 1996; Bennion et al, 2003; Gallstedt et al, 2004; Shweitzer et al, 2004; Parker et al, 1992; Ding et al, 2007; Orliac et al, 2003 and Morel et al, 2000).

They are often used on plant based proteins for the production of cast films. And are often a pre-treatment of the proteins, or used for the extraction of pure proteins.

For the material of the present invention the denaturants remain in the mixture while being processed, therefore are in the final product. Acting synergistically, in the denaturation, extrusion and injection mold processes.

From the experiments carried out so far, the solution needs to contain sodium sulfite. This was shown by both the SDS and Urea atone materials, producing a powdery material that was not consolidated. But once they were injection molded the material was no longer powdery. While high pressure and temperature can act like sodium sulfite, however sodium sulfite is always required. This can be explained by the increased temperature and high pressure inside the injection mold, which will increase the reshulffling of the disulfide bonds, acting like the sodium sulfite. This will produce a material that has extended chains with a lower density of cross links (these links will be further spread out in the material).

This phenomenon can be showed in the difference in water absorption. Where the extruded material has a lower water absorption, because the material is more dense.

The injection molding allows for the further extension of chains and therefore the cysteine residues will be further apart, giving the water more area to attach. Urea is very hydrophilic and may also affect this property.

From compression mold data, we found that pressure was needed to form a viable material. But the material produced was often not homogenous. The added mechanical shear in the extruder has allowed a homogenous and consolidated material to be produced.

Urea and SDS act as denaturants and plasticizers. The materials produced from all three or a combination of sodium sulfite and SDS or urea, are easier to process in the extruder and injection molder. A more homogenous material is produced than SS alone from extrusion.

Water also acts as a plasticizer. This was shown by the tensile tests of conditioned (10% moisture) and the unconditioned (30% moisture) samples. The unconditioned samples had a longer extension, but the young's modulus was an order of magnitude smaller. The strength (Max stress) also was smaller than the conditioned samples.

The cross-links in a native protein provide heat stability, but with heats during processing the kinetic energy produced will cleave these bonds. Therefore in theory all materials produced from protein sources are thermoplastic, unless chemically cross-linked, for example using formaldehyde to produce a thermoset material. Both the natural hydrogen bonds and disulfide bonds and un-natural lysinoalanine help form a "cross-linked" network, but they are analogous to synthetic cross-links, because they give the material strength but can be melted and reformed.

The addition of thiols and sulfite ions may competitively trap the dehydroalanine intermediate in alkali-treated proteins, thus preventing the formation of LAL. Friedman and others also conducted studies using sodium sulfite to prevent LAL formation. The presence of sodium sulfite resulted in significant decreases in LAL formation, suggesting that it was effective in inhibiting LAL formation (29). Therefore the use of sodium sulfite, breaks disulfide bonds, preventing the formation of lysinoalanine, and then once cooled the disulfide bonds should reform.

Using temperatures above 120° C. will reshuffle disulfides, but because both peptide bonds and disulfide bonds are covalent this could also degrade a protein chain. From the experiments using temperatures above 120° C., removes the water content resulting in material that is very irregular and brittle. Biochemistry studies on proteins have shown degradation of proteins, breaking peptide bonds, occurs at temperatures of 130° C. This could also explain the irregularity of the extrudate.

Conclusions

The plastics material is thermoplastic-like, and extrudable when using a combination of Sodium sulfite and SDS or Urea (or all three).

Sodium sulfite is essential for a homogenous and consolidated material, this also prevents potential unwanted heat stable covalent cross-links from occurring (lysinoalanine).

Urea and SDS act as denaturants and plasticizers. Water is a plasticizer.

80° C. minimum and 120° C. is the maximum temperature that can be used.

Injection molding after extrusion, with its additional pressure can produce a homogenous material from SDS or Urea alone, without the Sodium sulfite added.

Aspects of the present invention have been described by way of example only and it should be appreciated that modifications and additions may be made thereto without departing from the scope of appended claims.

References

Areas, J. A. G. (1992) 'Extrusion of Food Proteins'. Critical Reviews in Food Science and Nutrition. 32(4), 365-392.

Barone, J. R., Dangaran, K., and Schmidt, W. F. (2006) Blends of cysteine-containing proteins. *Journal of Agricultural and Food Chemistry* 54, 5393-5399.

Barone, J. R., Schmidt, W. F., and Gregoire, N. T. (2006) Extrusion of feather keratin. *Journal of Applied Polymer Science* 100, 1432-1442.

Bennion, B. J., and Daggett, V. (2003) The molecular basis for the chemical denaturation of proteins by urea. *Proceedings of the National Academy of Sciences of the United States of America* 100, 5142-5147.

Boye, J. I., Ma, C. Y. & Ismail, A. (2004) 'Thermal stability of β-lactoglobulins A and B: effect of SDS, urea, cysteine and N-ethylmaeimide'. *Journal of Dairy Research,* 71, 207-215.

Das, A., Chitra, R., Choudhury, R. R., and Ramanadham, M. (2004) Structural changes during the unfolding of Bovine serum albumin in the presence of urea: A small-angle neutron scattering study. *Pramana-Journal of Physics* 63, 363-368.

De Graaf, L. A. (2000) Denaturation of proteins from a non-food perspective. *Journal of Biotechnology* 79, 299-306.

De Graaf, L. A., and Kolster, P. (1998) Industrial proteins as a green alternative for 'petro' polymers: Potentials and limitations. *Macromolecular Symposia* 127, 51-58.

Ding, Y., Shu, Y., Ge, L., and Guo, R. (2007) The effect of sodium dodecyl sulfate on the conformation of bovine serum albumin. *Colloids and Surfaces A: Physicochemical and Engineering Aspects* 298, 163-169.

Francis F. J., Wiley encyclopedia of food science and technology. $2^{nd}$ edition. 2000.

Gallstedt, M., Mattozzi, A., Johansson, E., and Hedenqvist, M. S. (2004) Transport and tensile properties of compression-molded wheat gluten films. *Biomacromolecules* 5, 2020-2028.

Gonzalez-Jimenez, J., and Cortijo, M. (2002) Urea-induced denaturation of human serum albumin labeled with acrylodan. *Journal of Protein Chemistry* 21, 75-79.

Khan, M. Y., Agarwal, S. K., and Hangloo, S. (1987) Urea-Induced Structural Transformations in Bovine Serum Albumin. *The Journal of Biochemistry* 102, 313-317.

Lapanje, S. (1978) *Physical aspects of protein denaturation,* Wiley-Interscience Publication, New York.

Li, M., and Lee, T. C. (1996) Effect of Extrusion Temperature on Solubility and Molecular Weight Distribution of Wheat Flour Proteins. *J. Agric. Food Chem.* 44, 763-768.

Marion Pommet, A. R. M.-H. M. S. D. S. G. (2003) Thermoplastic processing of protein-based bioplastics: chemical engineering aspects of mixing, extrusion and hot molding. *Macromolecular Symposia* 197, 207-218.

Mizani, M., Aminlari, M. & Khodabandeh, M. (2005) 'An effective method for producing a nutritive protein extract powder from shrimp-head waste'. *Food Science and Technology international,* 11, 49-54.

Mo, X., and Sun, X. (2000) Thermal and Mechanical Properties of Plastics Molded from Sodium Dodecyl Sulfate-Modified Soy Protein Isolates. *Journal of Polymers and the Environment* 8, 161-166.

Mohammed, Z. H., Hill, S. E., and Mitchell, J. R. (2000) Covalent Crosslinking in Heated Protein Systems. *Journal of Food Science* 65, 221-226.

Morel, M. H., Bonicel, J., Micard, V., and Guilbert, S. (2000) Protein insolubilization and thiol oxidation in sulfite-treated wheat gluten films during aging at various temperatures and relative humidities. *Journal of Agricultural and Food Chemistry* 48, 186-192.

Orliac, O., Silvestre, F., Rouilly, A. & Rigal, L. (2003) 'Rheological studies, production, and characterization of injection-molded plastics from sunflower protein isolate'. *Ind. Eng. Chem. Res.,* 42.

Parker, W., and Song, P.-S. (1992) Protein structures in SDS micelle-protein complexes. *Biophysical Journal* 61, 1435-1439.

Rhim, J. W., Gennadios, A., Weller, C. L., and Hanna, M. A. (2002) Sodium dodecyl sulfate treatment improves properties of cast films from soy protein isolate. *Industrial Crops and Products* 15, 199-205.

Shweitzer, B., Zanette, D., and Itri, R. (2004) Bovine serum albumin (BSA) plays a role in the size of SDS micelle-like aggregates at the saturatuon binding: the ionic strength effect. *Journal of Colloid and Interface Science* 277, 285-291.

Singh, H. (1991) Modification of food proteins by covalent crosslinking. *Trends in Food Science & Technology* 2, 196-200.

Vanessa Schmidt, C. G. M. S. S. V. S. (2005) Soy Protein Isolate Based Films: Influence of Sodium Dodecyl Sulfate and Polycaprolactone-triol on Their Properties. *Macromolecular Symposia* 229, 127-137.

Whitford, D. (2005) *Proteins structure and function*, John Wiley & Sons, Ltd., Chichester.

Zewert, T. & Harrington, M. (1992) 'Polyethyleneglycol methacrylate 200 as an electrophoresis matrix in hydroorganic solvents'. *Electrophoresis*, 13, 824-831.

Zhang, Y., Ghasemzadeh, S., Kotliar, A. M., Kumar, S., Presnell, S. & Williams, L. D. (1998) 'Fibers from soybean protein and poly(vinyl alcohol)'. *Journal of Applied Polymer Science*, 71, 11-19.

Zhong, Z. K., and Sun, X. S. (2001) Thermal and mechanical properties and water absorption of sodium dodecyl sulfate-modified soy protein (11S). *Journal of Applied Polymer Science* 81, 166-175.

We claim:

1. A method of manufacturing a plastic material from blood meal, the method comprising:
    treating the blood meal with at least three denaturing agents, wherein the at least three denaturing agents comprise sodium dodecyl sulfate (SDS), urea, and sodium sulfite, to break interactions between proteins or portions thereof to form a denatured blood meal mixture; and
    treating the denatured blood meal mixture with sufficient pressure and temperature to consolidate the denatured blood meal mixture into the plastic material.

2. The method of claim 1, further comprising the additional step of:
    treating or adding to the denatured blood meal mixture at least one additive to control or prevent further crosslinks from forming during consolidation.

3. The method of claim 1, wherein the sodium sulfite is present at a range between 1% and 10% of the weight of the denatured blood meal mixture.

4. The method of claim 3, wherein sodium sulfite is present at range of between 2% and 6% of the weight of the denatured blood meal mixture.

5. The method of claim 1, wherein the SDS is present at a range between 0.5% and 10% of the weight of the denatured blood meal mixture.

6. The method of claim 5, wherein the SDS is present at a range between 0.5% and 2.5% of the weight of the denatured blood meal mixture.

7. The method of claim 1, wherein urea is present at a range between 2% and 30% of the weight of the denatured blood meal mixture.

8. The method of claim 7, wherein urea is present at a range between 15% and 25% of the weight of the denatured blood meal mixture.

9. The method of claim 1, wherein the blood meal makes up at least 20% (by weight) of the components in the denatured blood meal mixture.

10. The method of claim 9, wherein the blood meal is present at a range of between 44 and 55% of the weight of the denatured blood meal mixture.

11. The method of claim 1, wherein the denatured blood meal mixture further comprises a liquid.

12. The method of claim 11, wherein the liquid is water.

13. The method of claim 12, wherein the water is present at a range between 5% and 50% of the weight of the denatured blood meal mixture.

14. The method of claim 1, wherein the temperature for consolidation is between substantially 80° C. and 120° C.

15. The method of claim 1, wherein the pressure for consolidation is between substantially 1 and 5 MPa.

16. The method of claim 1, further comprising the additional step of:
    lysing whole cells prior to processing.

17. The method of claim 1, wherein the plastic material is thermoplastic or thermosetting.

18. The plastic material produced by the method of claim 1.

19. A thermoplastic material, comprising:
    a) blood meal; and
    b) at least three denaturing agents;
    wherein the at least three denaturing agents comprise SDS, urea, and sodium sulfite.

20. The thermoplastic material of claim 19, further comprising at least one additive which controls or limits the reformation of cross links.

* * * * *